Figure 1:
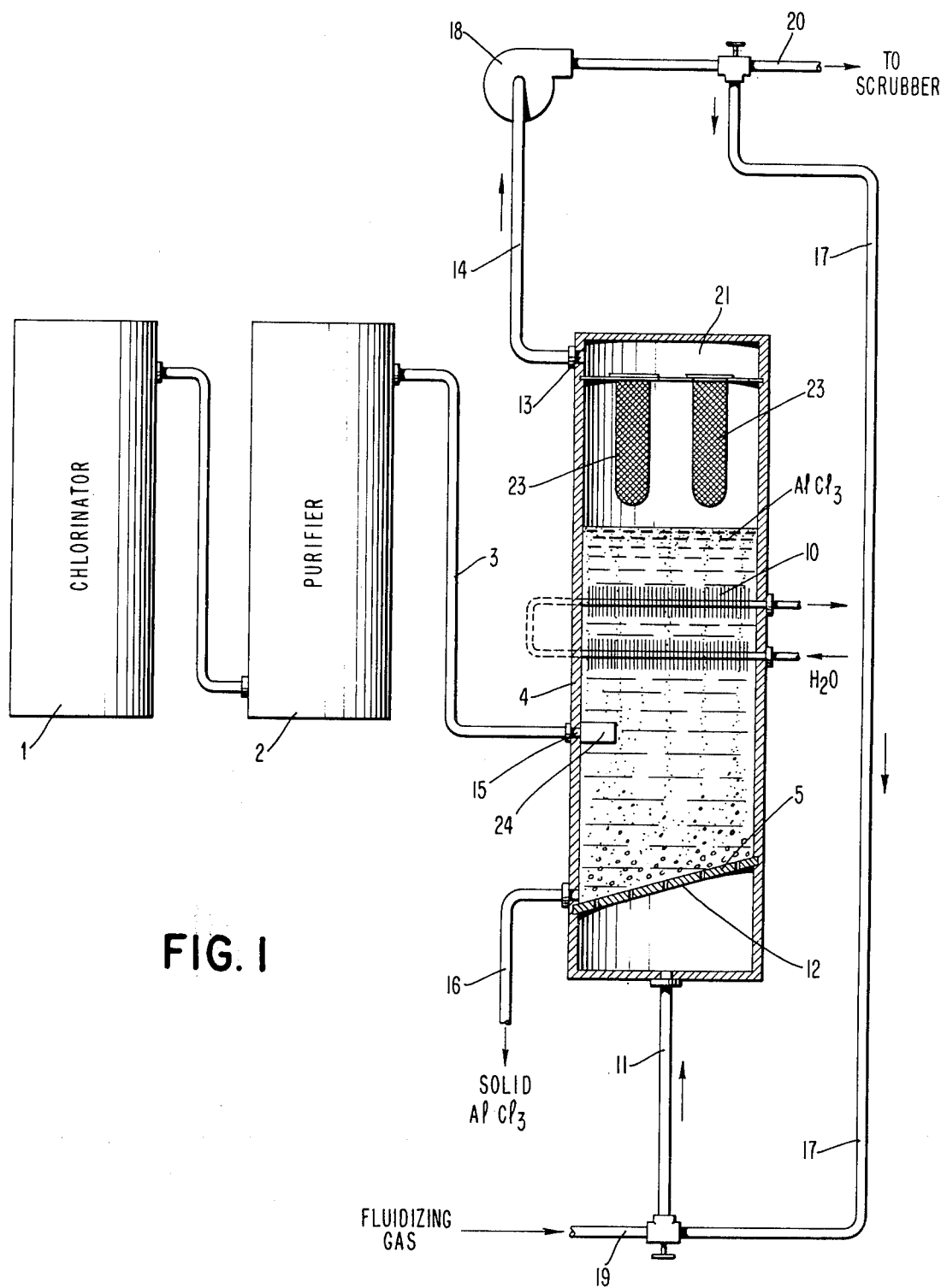

United States Patent [19]

Schoener et al.

[11] 4,029,750

[45] June 14, 1977

[54] SOLID PARTICULATE LOBULAR ALCL₃

[75] Inventors: Ronald C. Schoener, Lower Burrell, Pa.; Larry K. King; Lester L. Knapp, both of Maryville, Tenn.; Nicholas Kloap, Benton, Ark.

[73] Assignee: Aluminum Company of America, Pittsburgh, Pa.

[22] Filed: Aug. 26, 1974

[21] Appl. No.: 500,757

Related U.S. Application Data

[63] Continuation of Ser. No. 180,277, Sept. 14, 1971, abandoned.

[52] U.S. Cl. .............................. 423/495; 423/689
[51] Int. Cl.² ...................... C01F 7/56; C01F 7/58; B01D 7/00
[58] Field of Search ........................... 423/495, 496

[56] References Cited

UNITED STATES PATENTS

| | | | |
|---|---|---|---|
| 3,786,135 | 1/1974 | King et al. | 423/496 |
| 3,878,293 | 4/1975 | Piccolo et al. | 423/495 |

*Primary Examiner*—Edward Stern
*Attorney, Agent, or Firm*—Robert E. Isner

[57] ABSTRACT

Method and apparatus for directly desubliming gaseous aluminum chloride to solid form in a fluidized bed of solid particles of aluminum chloride at controlled temperatures for production of selectively constituted solid particulate aluminum chloride.

7 Claims, 7 Drawing Figures

SOLID PARTICULATE LOBULAR ALCL₃

This application is a continuation of our application Ser. No. 180,277, filed Sept. 14, 1971, now abandoned.

This invention relates to the production of aluminum chloride, i.e. $AlCl_3$ and more particularly to an improved method and apparatus for effecting the condensation of gaseous aluminum chloride to a selectively constituted and advantageous solid form in a fluidized bed of solid particles of aluminum chloride.

Although the potential advantages of utilizing aluminum chloride as a source material in the electrolytic production of aluminum have long been recognized, commercial realization thereof has been precluded by the inability of the art both to provide aluminum chloride of sufficiently high purity as to be utilizable therein and to provide aluminum chloride in any significant required quantity therefor in an economically acceptable manner. The long standing incentive and need for economically producible high purity aluminum chloride has resulted in extensive experimental explanation and evaluation of numerous suggested expedients for obtaining such long desired result. However, to date none of these suggested expedients has succeeded in satisfying the desired objective of commercial quantity production of economically producible high purity aluminum chloride.

In general, the reduction of aluminum-containing materials which chlorine in the presence of reducing carbon in some form to produce aluminum chloride is an old and generally well-known reaction. Such reaction proceeds vigorously and usually results in the provision of aluminum chloride is gaseous form in the elevated temperature gaseous effluent thereof.

One of the problems heretofore faced by the art has been the efficient and economical separation and recovery of such aluminum chloride values from the reaction effluent and, in particular, the actual separation and recovery of the produced gaseous aluminum chloride in readily usable form by condensation techniques has proved particularly troublesome because of the inherent characteristics of aluminum chloride during the condensation operations, and especially because of the influence of the vapor pressure of aluminum chloride on the degree of condensation under ambient conditions.

The invention may be briefly described as a process and apparatus for the efficient and continuous recovery of selectively sized and contoured aluminum $AlCl_3$ of an essentially contaminant free gaseous chloride from containing such aluminum chloride, chlorine, effluent phosgene and carbon monoxide emanating from the chlorination of alumina by the direct desublimation of such gaseous aluminum chloride in a self-replenishing fluidized bed thereof maintained at a predetermined temperature substantially below the upper ambient solidification temperature of aluminum chloride.

Among the advantages of the subject invention is the permitted economical and efficient recovery of aluminum chloride from the gaseous effluent emanating from the chlorination of alumina containing material; a permitted commercial quantity production of aluminum chloride and the production of selectively sized and contoured particles of aluminum chloride of advantageous character and which is particularly suited for the electrolytic production of aluminum therefrom.

The object of this invention is the provision of an efficient and economical process and apparatus for the continuous commercial quantity production of selectively constituted aluminum chloride from the residual hot gaseous effluent of the chlorination of alumina.

Another object of the invention is to provide an improved process for the continuous commercial quantity production of solid particles of aluminum chloride that, because of its readily handleable and flowable character, is particularly well suited for direct utilization in the electrochemical production of metallic aluminum.

It is a further object of the invention to provide an improved process and apparatus for carrying out the direct desublimation of gaseous aluminum chloride in a fluidized bed maintained at a temperature substantially below the upper ambient condition solidification temperature of aluminum chloride.

A further object of this invention is the provision of improved apparatus for effecting the selective introduction of the gaseous aluminum chloride substantially without loss of heat into a fluidized bed of particles of aluminum chloride remote from all contact surfaces to localize desublimation thereof on the particles of the fluidized bed material.

A still further object of this invention is the provision of solid selectively sized particles of aluminum chloride of generally lobular contour and characterized by the effective absence of planar exterior surfaces and relatively sharp protuberant angles.

Other and further objects of the present invention will become apparent from the within specification and from the accompanying drawing which illustrates the principles of the invention as embodied in certain presently preferred apparatus elements therefor, in which:

FIG. 1 is a schematic representation of apparatus elements utilizable in the practice of this invention.

Figure 2A:
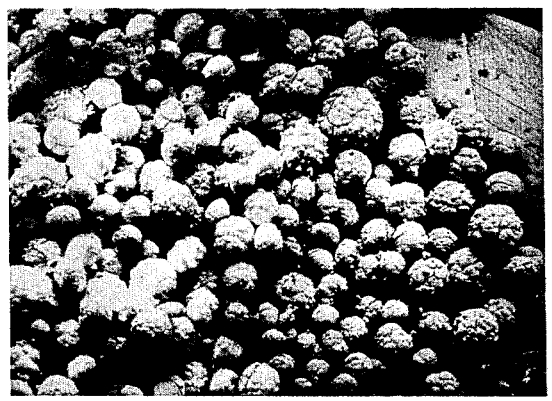
Figure 2B:
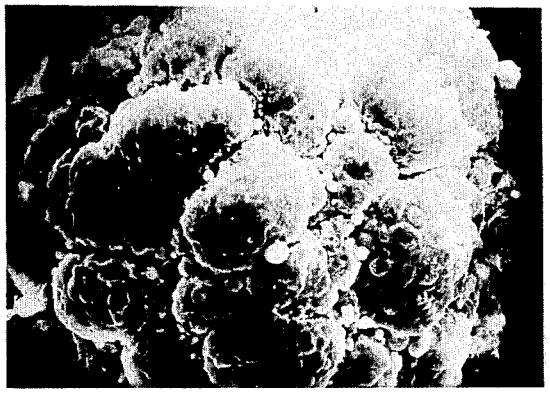
Figure 2C:
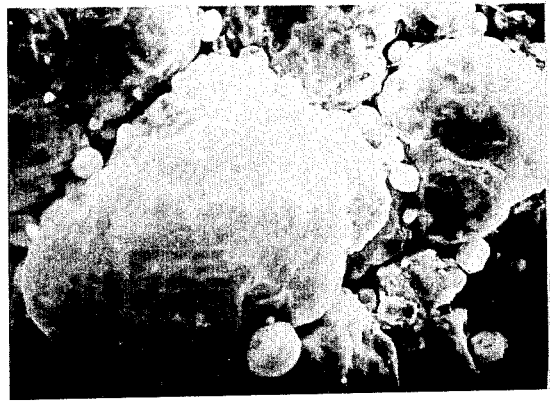

FIG. 2a, 2b, and 2c are photomicrographs, at 30, 200, and 500 magnifications respectively, illustrative of the selective configuration of a preferred product obtained through the practice of this invention.

Figure 3A:
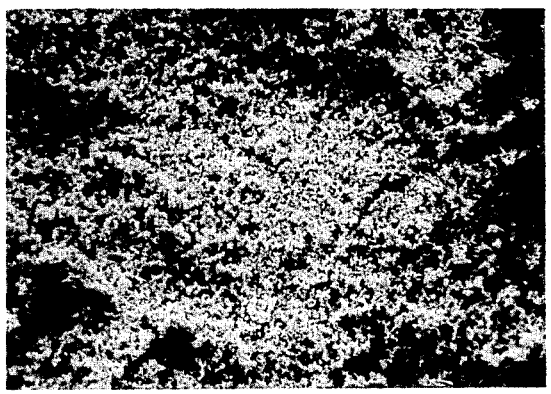
Figure 3B:
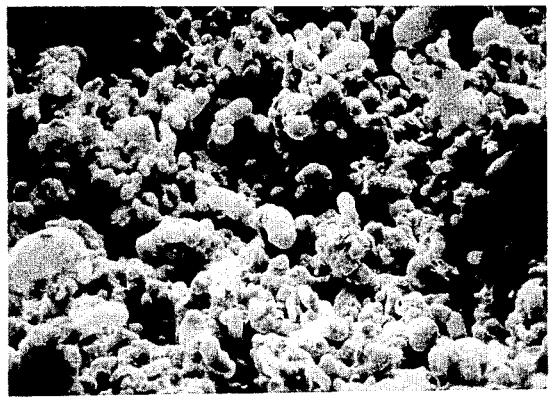
Figure 3C:
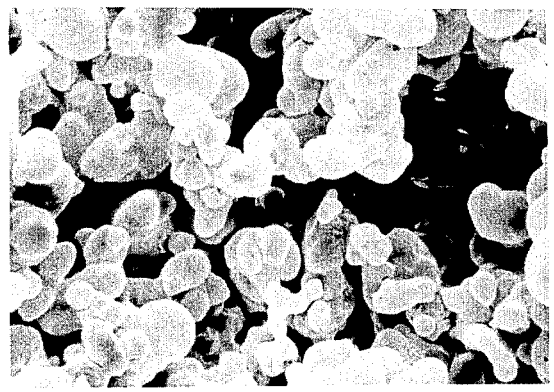

FIGS. 3a, 3b and 3c are photomicrographs, at 30, 200 and 500 magnifications respectively, illustrative of the selective configuration of a smaller sized product obtained through the practice of this invention.

In accordance with the principles of the present invention, a process for the efficient and economical commercial quantity recovery of solid aluminum chloride $AlCl_3$ of advantageous physical character from a gaseous aluminum chloride-containing carrier, such as the residual hot gaseous effluent of the chlorination of alumina, is now provided. Included therein is the selective desublimation of gaseous aluminum chloride in a fluidized bed of particles of aluminum chloride maintained at a temperature substantially below the upper ambient condition solidification temperature of aluminum chloride. Such desired operating temperature of the fluidized bed will range between 30°–100° C, suitably within about 60°–90° C and preferably within the range of about 50°–70° C. "Desublimation" as utilized herein refers to the direct formation of solid aluminum chloride from the gaseous phase thereof without any noticeable formation of an intermediate liquid phase.

The described desublimation of the aluminum chloride can be carried out at negative or vacuum pressures, e.g. down to about 0.1 atmosphere absolute, as well as at positive or elevated pressures, up to the pressure at which aluminum chloride would condense as a liquid under ambient conditions, subject to considerations of partial pressure of the aluminum chloride present under the ambient conditions. A preferred operating pressure is about 1.5 atmospheres gauge.

In the practice of the invention, any relatively pure gaseous aluminum chloride-containing gaseous carrier from any convenient source can be utilized as a source material. Suitably, a gaseous effluent of the type obtained from a precursor chlorination of sodium contaminated alumina in the presence of carbon and from which concomitant entrained particles of solids and liquids and condensable volatile constituents or impurities which condense at a higher temperature than the upper condensation temperature of aluminum chloride under the corresponding ambient conditions have been preliminarily removed, is preferably employed as the desired relatively pure source material.

The aluminum chloride-containing effluent source material which suitably comprises the residual hot gaseous effluent of the chlorination of sodium contaminated alumina may also contain chlorine, phosgene and carbon monoxide and dioxide, is of such character that, at a temperature of between about 150°–250° C, it is contacted directly directly within such fluidized bed of solid particles of aluminum chloride to directly desublime thereon and thereby endow the bed with a self-replenishing character as well as providing for production of aluminum chloride of selective size and configuration providing advantageous handling and flow characteristics. More particularly, such aluminum chloride will have an average particle size distribution of about 40–350 mesh, and predominantly about 100–350 mesh. The herein described fluidized bed condensation or desublimation process leads to an acceptably fine solid aluminum chloride product at a low level of cooling energy which is particularly suited, especially because of its particle size, configuration, and purity, for direct utilization in the electrolytic production of aluminum metal.

Advantageously, the residual gaseous mixture that remains after the direct desublimation of the aluminum chloride values has been effected and which will normally be constituted mainly of carbon monoxide and carbon dioxide along with small amounts of hydrogen chloride, carbon tetrachloride, phosgene and chlorine, may be recovered as effluent from the fluidized bed and portions thereof may desirably be recycled as fluidizing gas for the bed of aluminum chloride particles. Alternatively, any suitable substantially dry and nonreactive gas such as nitrogen, methane, air, carbon dioxide and/or carbon monoxide may be used to fluidize the bed.

The use of markedly low ambient desublimating or condensing temperatures in comparison to the solidification temperature of aluminum chloride, e.g. 30°–100° C as compared to 180° C, and the agitation inherently present in the fluidized bed of particles of aluminum chloride surprisingly results in the formation of a preferred range of size of particles as compared to that developed by desublimation at substantially higher temperatures in the vicinity of the actual ambient condition solidification temperature of aluminum chloride as well as selectively contoured particles of generally lobular configuration characterized by the substantial absence of generally planar exterior surfaces. Since such configuration and range of particle sizes contribute to easy handling for subsequent electrochemical conversion of the aluminum chloride to metallic aluminum, the use of desublimation temperatures well below the upper-ambient limits thereof according to the principles of this invention is highly advantageous. Thus, rapidly quenching the gaseous aluminum chloride in the fluidizing bed from a temperature of about 150°–250° C to below 100° C, and preferably to about 60° C, in a single stage or step, one would not have expected that readily handled and flowable particles of selective size and configuration would form.

Thus, by careful selection and control of the temperature of desublimation, and by using a fluidized bed of aluminum chloride particles in the condensation zone, it has been found that particles of selective configuration are produced and that the particle size of the solidified aluminum chloride can be selectively controlled. At lower temperatures within the specified range of about 35°–100° C, the average particle size of the desublimed product is generally smaller than those obtained at higher temperatures within such range. Depending on the particular temperature chosen, the aluminum chloride particles recovered will have an average particle size of about 40 to 350 mesh, and predominantly about 100–350mesh. Operating temperatures of lower than about 35° C for the fluidized bed are generally uneconomic and undesired since excessive coolant costs are necessitated and excessive amounts of titanium tetrachloride when present are condensed out of the effluent together with an increased amount of fines of aluminum chloride, whereas temperatures above about 100° C under the contemplated operating conditions result in an undue amount of incomplete desublimation of the gaseous aluminum chloride and undesirable loss thereof in the gaseous effluent, considering that a portion of such effluent gas is separated, usually continuously, from the system for scrubbing out the obnoxious and/or toxic substances therein.

For example, even at a relatively low temperature of about 90° C, as compared with an aluminum chloride solidification temperature of about 180° C at 1 atmosphere absolute and of about 150° C at about 0.5 atmosphere absolute, a certain amount of the gaseous aluminum chloride values will not desublime since the vapor pressure conditions in the fluidized bed favor retention of a portion thereof in the gaseous state. In this regard, under the ambient conditions of about 0.5 atmosphere, the vapor pressure of $AlCl_3$ 1 mm at 100° C, 0.32 mm at 90° C and 0.004 mm at 60° C, which confirms the desirability of using condensation temperatures at the lower end of the stated range of 35°–100° C, especially where lower ambient pressures are employed. Naturally, the presence of other volatile or gaseous materials mixed with the aluminum chloride may modify somewhat the aluminum chloride partial pressure in the system and thus the condensation temperature thereof.

In accordance with one aspect of the invention, the gaseous aluminum chloride-containing effluent is introduced into the fluidizing bed chamber, through an inlet maintained at a temperature above the condensation temperature of aluminum chloride under the ambient conditions and preferably in the range of about 180°–250° C. Such inlet is also so located that the gaseous aluminum chloride is introduced into the bed at a location remote from any contact surfaces in or of the vessel as for example, on cooling surfaces or the like, to prevent undesired or premature condensation of the gaseous aluminum chloride to liquid or solid phase at the inlet and at any such contact surfaces. Such premature condensation would soon lead to deleterious scale formation and a layered build-up of hard coating of solid aluminum chloride on the vessel walls as well as on any cooling surfaces in the vessel and even in the inlet entrance. This would not only constitute a loss of valuable product but also would lead to a relatively rapid plugging of the inlet entrance, and obstruction of the usable vessel space and insulating deterioration of the necessary cooling surfaces. Such undesired deposits would be difficult to remove yet without their removal inefficient heat exchange cooling, decrease in usable vessel space and possible plugging of the inlet entrance would eventually be effected.

The above noted problems involved in effecting the condensation of relatively pure gaseous aluminum chloride directly to solid form in a single stage are not generally encountered in condensation of other materials in a fluidized bed. For example, materials such as phthalic anhydride which are condensed in a fluid bed are soft enough to abrade away from any given contact surface of the condenser vessel under the scouring action of the moving fluidized particles. Thus, in the instant situation the temperature, vapor pressure and locus of desublimation must be controlled to avoid premature and detrimental condensation of the gaseous aluminum chloride to liquid form and at locations other than that heretofore described to effectively avoid agglomeration of the bed particles and eventual failure of the bed, clogging of the inlet entrance and deposition on cold surfaces of the chamber. Likewise, the gaseous effluent should comprise relatively pure aluminum chloride, since of course, any significant impurity content, e.g. of sodium aluminum chloride as a complex mixture with aluminum chloride, if not removed from the intended influent before it reaches the inlet entrance, would soon clog such entrance as a collected liquid condensate thereat due to its relatively higher condensation temperature as compared with the relatively cool environment of the chamber.

While normally the gaseous aluminum chloride-containing carrier subjected to the condensation fluidized bed treatment according to the invention will be the gaseous effluent recovered from a chlorination reaction of the foregoing type, such carrier can be effluent from a different type chlorination procedure or reaction or can be a gaseous aluminum chloride containing carrier supplied from any convenient source, so long as the particular carrier is substantially free from undesired contaminants which would detract from the intended desublimation step.

As illustrated in the drawing, an aluminum chloride containing gaseous effluent from a chlorinator 1 is initially passed through purification apparatus 2 wherein entrained particles and condensable volatile constituents that condense above the upper ambient condition solidification temperature of aluminum chloride are removed. The residual gas which will be at a temperature that is sufficiently high to preclude condensation of aluminum chloride therefrom under the ambient condition is introduced through the feed line 3 into a fluidized bed of particles of aluminum chloride disposed within a chamber 4. The fluidized bed condenser chamber 4 includes a fluidizing gas distribution inlet 12 at its lower end supplied with fluidizing gas through line 11. A separator 21, suitably a permeable filter medium 23 and a residual gaseous effluent outlet 13 at its upper end connected to an outlet conduit 14 and an aluminum chloride outlet 16 at the dependent terminus of an inclined or sloped perforated distribution plate 5 disposed adjacent the bottom of the chamber for directing the heavier particles toward the outlet for effecting withdrawal of condensed aluminum chloride solids therefrom are also included therein. Examplarly disposed within the upper portions of the illustrated fluidized bed is a heat exchanger such as finned coils 10, for cooling the contents thereof and for maintaining the temperature of the bed within predetermined ranges. The purified residual gas exiting from the purifier 2 and contained the gaseous aluminum chloride values is introduced into the fluidized bed at a location remote from the cooling fins and from any contact surfaces therein.

A residual gaseous effluent recycle conduit 17 is connected intermediate the residual gaseous effluent outlet conduit 14 and the fluidizing gas distribution inlet 12 to permit the recycling and use of portions of the residual gaseous effluent as fluidizing gas. For such purpose, a compressor or pump 18 is desirably interposed in the outlet conduit 14. Alternatively, an independent source of fluidizing gas can be fed via supply line 19 for fluidizing the bed, instead of or in addition to the residual effluent gas fed via recycle conduit 17. Where the recycle conduit 17 is emloyed for supplying fluidizing gas for the system, such gas of course will contain mainly carbon dioxide and carbon monoxide and perhaps some residual amounts or traces of unreacted chlorine, hydrogen chloride, phosgene or carbon tetrachloride, since it represents the final off gas residuum from the chlorination reaction. A portion of such off gas is removed via line 20 and scrubbed to remove obnoxious constituents before discarding. When an independent source of fluidizing gas is used, all of the off gas is normally removed via such line 20.

More specifically, this off gas removed from the closed system at line 20, containing predominantly chlorine, hydrogen chloride and phosgene as obnoxious and toxic constituents must be cleaned before the gas can be vented to the atmosphere. Thus, the off gas can be scrubbed of these constituents with caustic, e.g. sodium hydroxide, or with sodium carbonate, etc., in the conventional manner, and then be vented. Furthermore, the gas can be burned in a furnace with hydrogen (or a source thereof, such as methane) to produce hydrogen chloride from the chlorine and phosgene, followed by scrubbing of the so-treated gas before venting or any other conventional method of removing these obnoxious and toxic constituents from the off gas can be utilized.

In accordance with a further feature of the invention, the inlet 15 for the gaseous aluminum chloride-containing gas is provided with means to maintain the temperature of the incoming gas at an elevated value, such means shown schematically at 24, may suitably comprise auxiliary heating means, such as electrical resistance heating means, or may comprise heat insulation material, such as quartz, alumina, graphite, asbestos and the like, at the entrance thereof to minimize, if not prevent, premature cooling and liquification or solidification of the gaseous aluminum chloride passing therethrough which would tend to clog the same to impede or otherwise deleteriously affect the desired condensation or desublimation operation. Thus, the means for controlling the temperature of the inlet gas contemplated herein will function to permit introduction of the flow of gaseous aluminum chloride-containing fluid substantially without loss of heat into the interior of the fluidized bed.

Because of the need to avoid premature condensation of the gaseous aluminum chloride at locations other than in the fluidized bed itself, considering the ambient conditions, the entrance of inlet 15 desirably projects appreciably into the bed and terminates remote from all contact surfaces therewithin including the walls of the chamber and the cooling means 10. In this wa, as the incoming gaseous chloride-containing carrier enters the condenser chamber 4 in such manner as to immediately contact the bed particles and the aluminum chloride values therein will condense before there is any chance of contact thereof with the adjacent apparatus surfaces. By the time the mixture of residual gaseous effluent and fluidizing gas exits from the top of the bed, the aluminum chloride values therein have sufficiently changed to solid phase and built up in solid particle form to avoid significant entrainment in the exiting gaseous mixture and are heavy and hard enough to operate as a particle component of the fluidized bed in the vicinity of the chamber walls and cooling means without danger of deposition thereon.

The ambient conditions at the locus of condensation should be such that the vapor pressure of the aluminum chloride is just low enough to desublime the same to solid form without causing any deposition of residual aluminum chloride either in solid or liquid form on the surface of the permeable filter medium 23 of the separator 21.

The singular nature of the product resulting from the hereinabove described direct desublimation recovery of aluminum chloride values is illustrated, under various magnifications in FIGS. 2 and 3 of the drawings. As best shown in FIG. 2a (under 30X magnification) the particles of aluminum chloride are of generally spheroidal character presenting a generally lobate curvilinear external contour and characterized by a marked absence of planar exterior surfaces and relatively sharp protuberant angles that are normally characteristic of fracture planes or the like. As becomes apparent from FIGS. 2b and 2c the particles of aluminum chloride are compositely constituted of agglomerated, cemented or otherwise autogeneously bonded pluralities of smaller sized particles of rather widely varying dimension but of generally spheroidate character. Because of such composite constitution the exterior surfaces of the particles, while still curvilinear in character, are of generally lobular and bullate character and present marked localized departures from true spheroidal character and hence the term "lobular" will be herein utilized to describe the general character of the resultant particles.

FIG. 3a illustrates (under 30X magnification) a much finer aluminum chloride product obtainable by the practice of this invention. As evidenced by FIGS 3b and 3c however the particles here are of markedly more lobate character. It is equally apparent however that the particles again present a generally lobular curvilinear external contour and are characterized by a marked absence of planar exterior surfaces and relatively sharp protuberant angles and are compositely constituted of agglomerated or otherwise joined pluralities of smaller sized particles of widely varying dimensions but of spheroidate or lobate character.

The solid lobular aluminum chloride particlees of generally curvilinear contour of the invention essentially contain rounded lobes or lobules which often impart an apparent bullate, blistered and/or nodular composite surface configuration.

As will now be apparent to those skilled in this art the generally lobate character of this product differs markedly from conventionally produced aluminum chloride that is commercially available. Not only does this new material provide marked advantages in both handling and flowability but the herein described invention avoids any crushing or grinding operation with their attendant contamination with impurities from the equipment employed but more significantly avoids exposure of the aluminum chloride product to the air with its ever attendant hazard of contamination by air borne moisture.

The new product obtained through the practice of this invention has a bulk density in the range of about 75 to 105 lbs. per cu. ft. (for a particle size range of from about 40 to 350 mesh). Samples of FIG. 3 type product have been found to have an angle of repose in the range of about 35° to about 41°, and a mean of about 38°, when measured in a dry nitrogen atmosphere by the International Standards Organization Method ISO/PC 47 (Secretariat 247) 424 for measurement of the angle of repose of alumina. Because of the greater spheroidicity of the FIG. 2 type product lower angles of repose will normally be characteristic thereof. As a matter of caution however, it should be noted that values for the angle of repose depends largely upon the measurement techniques employed and there is little, if any, standardization in such measurement techiques generally, and the requirement of maintaining this particular product in a contaminant free environment further complicates the problems of measurement thereof.

EXAMPLE

The following example is set forth to illustrate, without limitation, various features of the present invention.

Carbon impregnated or coked porous alumina particles were chlorinated at elevated temperature and the resulting gaseous reaction mixture treated to remove entrained particles of solids and liquids and condensable volatile impurities which condense at a higher temperature than the condensation temperature of aluminum chloride under the ambient conditions, so as to provide a relatively pure gaseous effluent containing essentially only aluminum chloride, carbon dioxide and carbon monoxide as well as trace amounts of other impurities, e.g. chlorine, hydrogen chloride, phosgene, carbon tetrachloride, and the like.

Such relatively pure gaseous effluent at about 200° C entered the desublimer of condenser chamber 4 shown in the drawing via the heat insulated inlet 15 at a rate of about 885 cubic feet per hour. Condenser chamber 4 on the average contained a bed of about 90 pounds of relatively pure aluminum chloride solid particles of an average size distribution of about 40 to below 200 mesh maintained in fluidized condition by passage of fluidizing gas (i.e. dry air) via line 19 upwardly through distribution inlet 12.

The heat exchanger 10 was cooled by passing water at about 20° C through cooling coils so that the average 200° C inlet gas entering through feed conduit 3 was quenched to about 60° C on the relatively pure aluminum chloride particles maintained in the fluidized bed.

The quenched or cooled gaseous aluminum chloride apparently formed solid nuclei particles which built up to larger particles and/or deposited on oher solid aluminum chloride particles already present in the bed. As the particles of aluminum chloride increased in size, they were removed constantly from the bed via outlet 16 and in an average particle size distribution as noted above. Under the specified conditions no appreciable or troublesome deposition of condensed aluminum chloride occurred either in the heat insulated inlet nor on any contact surfaces within the chamber, i.e. including the chamber walls and the cooling coils.

The off gas from the fluidized bed maintained in condenser chamber 4 was passed through the filter assembly 21 and the separated entrained aluminum chloride solids and dust were returned directly back to the bed. Such off gas contains primarily carbon dioxide, carbon monoxide and air with trace amounts of unreacted chlorine, hydrogen chloride, phosgene, carbon tetrachloride and the like.

The aluminum chloride $ALCL_3$ product recovered at a rate of 73 pounds per hour via outlet 16 was a relatively fine solid product of generally lobate and spheroidate character as described earlier, having less than about 0.3% by weight total content of combined oxygen impurities, a low content of adsorbed carbon dioxide and phosgene (trace amounts), an average particle size distribution of:

+40 mesh (retained; 8%
100 mesh; 22%
(passes through); 40%
and a density of about 75–105 lbs./ft.$^3$.

What is claimed is:

1. Solid lobular $AlCl_3$ of essentially curvilinear contour compositely constituted of autogeneously bonded pluralities of smaller sized particles of essentially spheroidate character and characterized by the absence of planar exterior surfaces and sharp proturberant angles.

2. Aluminum chloride as set forth in claim 1 further characterized by a bulk density of about 75–105 lbs./cu. ft.

3. Aluminum chloride as set forth in claim 1 having an average particle size distribution of about 40 to 350 mesh.

4. Solid particulate $AlCl_3$ of essentially lobular character presenting an essentially bullate surface and having an average particle size of less than about 40 mesh with the particles thereof compositely constituted of agglomerated pluralities of smaller sized particles of essentially spheroidate character and characterized by the absence of fracture induced planar exterior surfaces and sharp protuberant angles.

5. Aluminum chloride as set forth in claim 4 further characterized by a bulk density of about 75–105 lbs/cu. ft.

6. Aluminum chloride as set forth in claim 4 having an average particle size distribution of about 40 to 350 mesh.

7. Solid lobular $AlCl_3$ compositely constituted of autogeneously bonded pluralities of similar sized particles of essentially spheroidate character characterized by the absence of fracture-induced planar exterior surfaces and sharp protuberant angles.

* * * * *

UNITED STATES PATENT OFFICE
CERTIFICATE OF CORRECTION

Patent No. 4,029,750   Dated   June 14, 1977

Inventor(s) Ronald C. Schoener, et al.

It is certified that error appears in the above-identified patent and that said Letters Patent are hereby corrected as shown below:

Column 1, line 22, "explanation" should read -- exploration --.

line 30, "which" should read -- with --.

line 35, "is" should read -- in --.

line 51, delete "$AlCl_3$".

line 52, after "chloride" insert -- $AlCl_3$ --.

Column 3, line 23, delete "directly", second occurrence.

Column 4, line 46, after "$AlCl_3$" insert -- is --.

Column 6, line 11, "contained" should read -- containing --.

Column 7, line 10, "wa" should read -- way --.

line 66, "particlees" should read -- particles --.

Column 8, line 53, "of" should read -- or --.

line 58, "200" should read -- 100 --.

Column 9, line 1, "oher" should read -- other --.

line 21, "73" should read -- 72 --.

Signed and Sealed this

Seventeenth Day of January 1978

[SEAL]

Attest:

RUTH C. MASON
Attesting Officer

LUTRELLE F. PARKER
Acting Commissioner of Patents and Trademarks